US012769270B2

(12) United States Patent
Bentley et al.

(10) Patent No.: US 12,769,270 B2
(45) Date of Patent: Oct. 20, 2026

(54) COOKING PROGRAM MANAGEMENT SYSTEM

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 556 days.

(21) Appl. No.: 17/980,602

(22) Filed: Nov. 4, 2022

(65) Prior Publication Data

US 2024/0152102 A1 May 9, 2024

(51) Int. Cl.
*G05B 19/042* (2006.01)

(52) U.S. Cl.
CPC .... *G05B 19/042* (2013.01); *G05B 2219/2643* (2013.01)

(58) Field of Classification Search
CPC .......... G05B 19/042; G05B 2219/2643; G05B 19/0426
See application file for complete search history.

(56) References Cited

U.S. PATENT DOCUMENTS 6,653,609 B2 * 11/2003 Ozawa ................. H05B 6/6438 709/246
6,949,729 B1 9/2005 Ishikawa
8,419,434 B2 4/2013 Do
9,536,237 B2 1/2017 Argue
10,332,045 B2 6/2019 Cartwright
2008/0236562 A1 * 10/2008 Sager ................... H05B 6/6441 455/41.3
2013/0214935 A1 8/2013 Kim
2017/0016623 A1 1/2017 Rabie
2017/0168675 A1 * 6/2017 Giacomini .......... G06F 3/04845
2019/0213914 A1 * 7/2019 Vallance ............ G09B 19/0092
2021/0406545 A1 * 12/2021 Dulski .................... G06V 20/20
2023/0079494 A1 * 3/2023 Koltai ................ G06Q 30/0283 705/28

(Continued)

FOREIGN PATENT DOCUMENTS

JP 2003022305 A 1/2003

OTHER PUBLICATIONS

CozZo, online:Cozzo.app, accessed Feb. 23, 2021.

(Continued)

*Primary Examiner* — Mohammad Ali
(74) *Attorney, Agent, or Firm* — Michael E. Tschupp; Andre Pallapies; Brandon G. Braun

(57) ABSTRACT

Systems and methods are provided for the management of cooking programs associated with one or more cooking appliances associated with a user. An electronic device receives one or more food purchase records including information relating to food items. Based on the food item information, one or more relevant cooking programs are determined, those programs being suitable for automatically preparing the food item(s) using the one or more cooking appliances. The electronic device communicates the cooking programs to the cooking appliance(s), and causes the cooking appliance(s) to display shortcuts to the one or more cooking programs on a user interface.

20 Claims, 10 Drawing Sheets

(56) References Cited

U.S. PATENT DOCUMENTS

2024/0296286 A1 * 9/2024 Neumann .............. G16H 20/60

OTHER PUBLICATIONS

Chefling, Chefling, inc., online: thespoon.tech, Published Jan. 30, 2019.
TovalSmart Oven, Tovala, Online: Tovala.com, accessed Feb. 23, 2021.

* cited by examiner

COOKING PROGRAM MANAGEMENT SYSTEM

FIELD

This disclosure relates to systems and methods for managing the operation of cooking appliances, such as ovens.

INTRODUCTION

Every year cooking appliances become more advanced. Current appliances, such as ovens, have a variety of cooking functions, such as baking, broiling, frying, grilling, etc. Appliances may also have cooking programs which optimize cooking by quickly providing the temperature and cooking time for a given food. For instance, a cooking program for chicken can automatically provide the temperature and cook time to cook the chicken. Still more options are becoming available to improve the cooking process, such as food recognition, temperature sensing, etc. However, a number of these improvements may go unused in the cooking process due to variety of factors, such as a lack of instructions. For instance, a user may be intimidated or confused by a particular cooking function, or a user may only use a select number of known cooking programs and avoid others, though superior programs may be available.

SUMMARY

The present disclosure provides systems, apparatuses, and methods relating to cooking program management based on available food items and appliances.

In some examples, a computer-implemented method for managing cooking programs associated with one or more cooking appliances includes: receiving, at an electronic device in communication with an electronic controller of a cooking appliance associated with a user of the device, a food purchase record including information relating to a food item; determining, based on the information relating to the food item, one or more cooking programs configured to be executed by the electronic controller to prepare the food item using the cooking appliance; communicating, by the electronic device, instructions corresponding to the one or more cooking programs to the cooking appliance; and causing, using processing logic of the electronic device, the cooking appliance to display indicia indicating a shortcut to the one or more cooking programs on a user interface of the cooking appliance.

In some examples, a system for preparing a food product includes: a cooking appliance having an electronic controller and a first user interface, wherein the electronic controller is configured to display a plurality of cooking programs for selection by a user, and to execute a selected one of the cooking programs based on user input; a personal electronic device in communication with the cooking appliance, wherein the personal electronic device includes a second user interface and processing logic configured to: receive information relating to available food preparation features of the cooking appliance and information relating to a food product; determine one or more corresponding cooking programs configured to prepare the food product using one or more of the available features of the cooking appliance; communicate the one or more corresponding cooking programs to the cooking appliance; and cause the cooking appliance to display indicia on the first user interface of the cooking appliance, indicating respective shortcuts configured to execute the one or more corresponding cooking programs.

Features, functions, and advantages may be achieved independently in various embodiments of the present disclosure, or may be combined in yet other embodiments, further details of which can be seen with reference to the following description and drawings.

DETAILED DESCRIPTION

Figure 1:
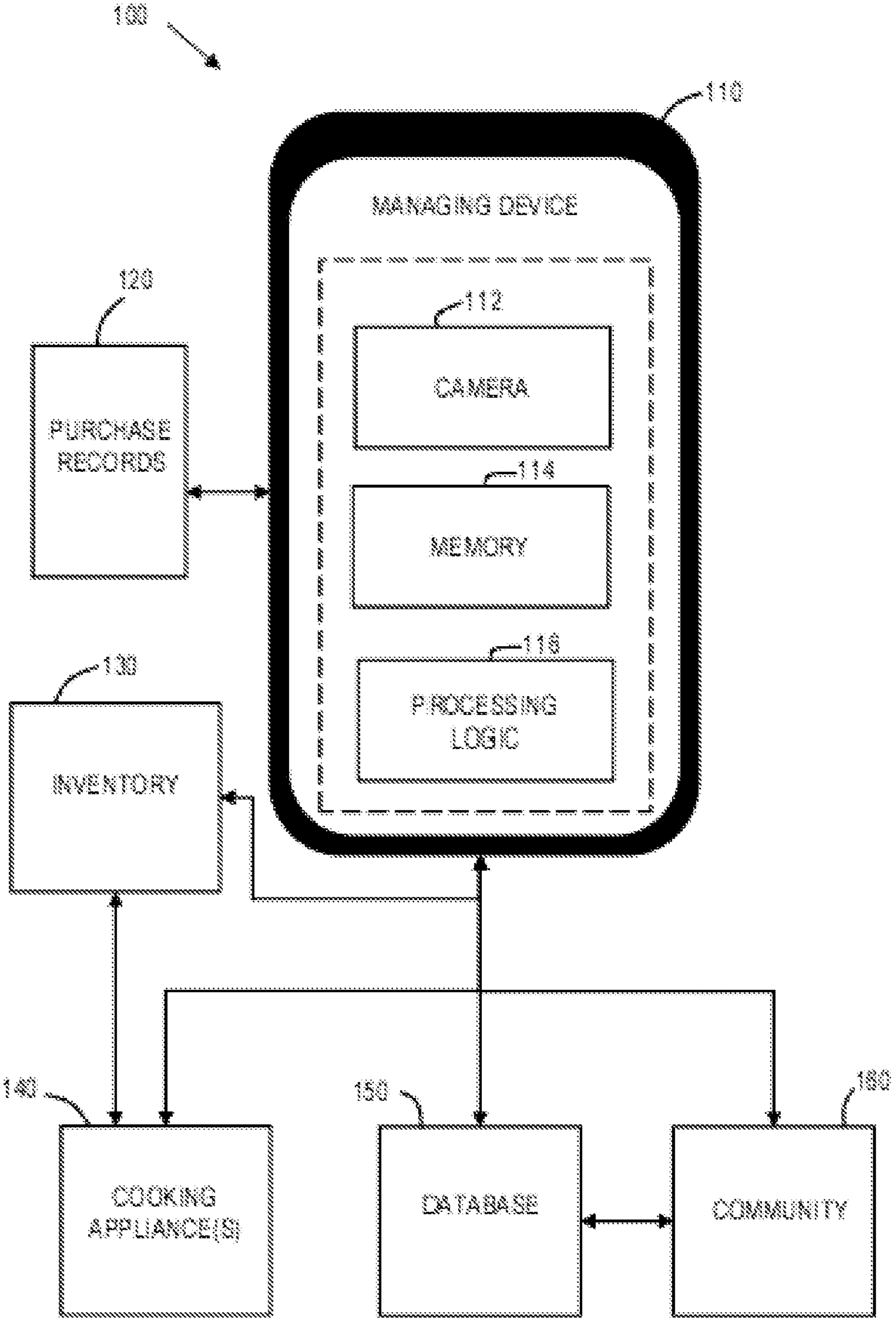
FIG. 1 is a schematic diagram of an illustrative cooking program management system as described herein.

Various aspects and examples of a cooking program management system configured to use food purchase records to manage cooking programs are described below and illustrated in the associated drawings. Unless otherwise specified, a cooking program management system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, cooking program management systems of the present disclosure are configured to improve the ease of use for cooking programs associated with certain appliances (e.g., smart ovens and the like), in part by enabling the creation of shortcuts to and/or the generation of specialized cooking programs based on the food items and appliances known to be available to the user. The system may include a managing device configured to receive food purchase records, such as grocery receipts, and to manage automatic cooking programs of selected cooking appliances (e.g., instructions for automatically cooking a food item). Such management may include creating shortcuts to and/or generating cooking programs, automatically distributing cooking programs to available appliances, etc. The managing device may be configured to connect and communicated with various other devices over a network connection. For example the managing device may communicate with a database storing information about food items, cooking programs, etc., and with one or more cooking appliances configured to receive cooking programs from the management system. In some examples, the managing device gathers information from the database, the cooking appliances, and other possible sources to identify food items and/or to generate cooking programs and/or create shortcuts to cooking programs for the identified food items.

In some examples, the managing device is configured to receive a variety of purchase records. The managing device may be configured to automatically receive or retrieve purchase records from online or brick-and-mortar stores and/or send requests for purchase records once notified that a user has obtained food items. For example, the managing device may send a request for a digital receipt to a store where the items were expected to be purchased. If a receipt is physical, the managing device may be configured to scan and/or otherwise analyze an image to import the items from the receipt. In some examples, the items are typed or otherwise entered (e.g., dictated) into the managing device. In some examples, the managing device sends a request to the cashier or store system to transfer the purchase record.

In some examples, the managing device is configured to analyze the text of received purchase records (using word recognition, for example) to identify food items, which include any form of foodstuff, such as chicken, bread, etc., as well as any convenience foods or packaged foods, such as ready-made meals or frozen foods. In some examples, information available in the purchase record, such as the brand or nutrition information of the food items, is used by the managing device. For example, an item designated "Generic Pizza" may be identified as a food item. Items identified as non-food items are, in some examples, ignored or discarded from further processing in the cooking program management system. The managing device may gather additional information about the food item from the purchase record to specifically identify the food item. This additional information may include the manufacturer of the food item and/or the variety of the food item (is the food a spicy version of a base food item product, etc.).

In some examples, the identified food items are further organized by the managing device into relevant and less-relevant categories. The relevant category includes all food items that may be cooked using a cooking program. The less-relevant or non-relevant category includes those food items have no need for a cooking program (e.g., food that does not need to be cooked and/or prepared, such as mixed nuts). The managing device may be configured to compare identified food items to food item data. Using the example of "Generic Pizza", the managing device may categorize the item as relevant based on the name itself and/or by comparing it to a list of known, relevant food item names (food items that have or can have associated cooking programs). Information on cooking appliances available to the user may be used when categorizing food items. For instance, if a food item requires a specific cooking appliance that is unavailable to the user, the managing device may not categorize the food item as relevant, since, though the food item may be cooked and/or prepared, the user has no available means of preparing the food item. Such items may be relegated to a third, "pending available appliance" category.

In some examples, all food items present in purchase records are added to an inventory of food items (a list of all the food items available to a user). The inventory may display the food item, brand, variety, and/or quantity, amongst other things. In some examples, food items are uploaded first to the inventory of items, and the managing device identifies the newly added food items. The database of the cooking program management system may provide information to aid in the process of identifying and categorizing food items. The database may be stored in the managing device or stored elsewhere, such as the cloud. Any information useful to the managing device may be stored in the database, including but not limited to food item types, names, brands, and/or varieties. By utilizing the database, a wider range of information may be available to the managing device than what is available on the purchase record, enabling for a wider variety of food to be properly identified.

In some examples, the managing device includes processing logic and/or software configured to perform image recognition on food items and/or food item packaging. For example, the system may be configured such that the user can upload food item information by creating or providing images of the food items. The food item(s) in the images are automatically recognized, identified, and categorized by the system.

The cooking program management system may generate cooking programs and/or create shortcuts to cooking programs based on the identified food items. Cooking programs include instructions detailing the temperature, the appliance mode to use (such as baking), the time required to cook a food item, and in some cases various stages including different values for one or more of these settings. Cooking programs may be designed by the management system to automatically perform given food item instructions (such as those on a food package) or may be designed to cook a food until reaching a desired food temperature, texture, color, etc. In some examples, the managing device is configured to generate cooking programs and/or create a shortcut to one or more existing programs by matching an identified food item to the capabilities of available cooking appliances. These cooking programs and/or program shortcuts are, in some examples, sent to cooking appliances to be accessed by a user when preparing food. In some examples, a shortcut to a cooking program may include adding the program to a quick selection list (e.g., a list that is featured prominently or easily accessible when the cooking appliance is activated).

In some examples, instructions associated with (e.g., present on packaging of) the identified food item are used by the managing device to generate a cooking program and/or provide a shortcut to a cooking program. In some examples, the managing device retrieves the instructions through scanning a barcode, QR code, or an image of the food item and/or processing the printed text on the package. In some examples, the managing device retrieves the instructions digitally using the identity of the food to locate related information (for example, certain food items may have instructions stored online, e.g., associated with the food item in a relational database). The managing device may gather more information from the database when creating shortcuts to and/or generating cooking programs. The database may include any other previous mentioned forms of information used, such as food instructions and/or existing cooking programs.

In some examples, the cooking program management system includes a community feature which includes user-provided reviews of cooking programs, reviews of food items, and/or custom cooking programs. Other social media features may also be included, such as users assisting other users in matters of cooking through answering questions or providing general cooking advice. The community may involve a reward program, e.g., giving users prizes or money for designing cooking programs or writing reviews. Data of the cooking programs custom-made by users of the community may be stored in the database. In some examples, the managing device is configured to provide access to the custom cooking programs through a browsing feature, where the user may browse through a list of cooking programs other users have generated. In some examples, the managing device is used to modify custom cooking programs from the community to generate new, personalized cooking programs.

Cooking appliances may provide information regarding cooking programs to the management system. In some examples, the cooking appliances have cooking programs already stored in memory, and the managing device may pair one or more of the cooking programs with identified food items. Shortcuts may be created. In some examples, the capabilities of cooking appliances are used by the managing device when creating shortcuts and/or generating new cooking programs. For example, the managing device may determine that none of the available cooking appliances is an air fryer or has an air fryer function. The managing device may use this information to avoid generating programs that use an air fryer. In some examples, the managing device prioritizes cooking programs that use favorite, highly rated, or unique features of the cooking appliance. Feature ratings may be determined by retrieving and comparing information user reviews and/or specifications of the cooking appliance.

More advanced cooking programs may be generated or highlighted by the cooking program management system. Creation of these advanced cooking programs may require further information, which the managing device may receive from the database, cooking appliances, and/or other sources. Advanced cooking programs are different from basic cooking programs (programs based on general, "universal" cooking instructions, such as bake at 350 degrees) by having more steps and/or a specific goal when cooking (such as providing a specific degree of browning). In some examples, advanced cooking programs use multiple functions of a cooking appliance during the cooking process (e.g., switching from baking to broiling).

The managing device may also use instructions provided by the user to generate a customized cooking program. For example, the user may request that a pizza be cooked such that the crust is crunchy. The managing device, upon receiving this request, may generate a cooking program by combing the information of available cooking appliances capabilities, information in the database, information of custom cooking programs (which may already have instructions that satisfy the user's request and use cooking appliances available to the user), etc.

The cooking program management system may send generated cooking programs and/or created program shortcuts to available cooking appliances. In some examples, the managing device connects to a cooking appliance through a home network (e.g., wired or wirelessly) and transfers the cooking program to an electronic controller of the cooking appliance. A user interface (e.g., a touch-enabled screen) on the cooking appliance may display available cooking programs to be selected. In some examples, all cooking programs may be accessible on the managing device. Selecting a cooking program on the managing device may remotely activate the respective cooking appliance(s) to start the program. In some examples, the cooking programs available are a combination of advanced, basic, and user-generated cooking programs. Cooking programs may be accessible on both the managing device and the cooking appliance. In some examples, cooking programs are sent to only the cooking appliances capable of performing the programs. The managing device may determine capabilities through information stored in the cooking appliances, the database, and/or the memory of the managing device.

In some examples, cooking programs and program shortcuts may be modified to alter instructions and/or display prioritization. For example, user behavior may be used by the managing device to organize the program shortcuts to place more frequently used cooking programs first (if the user regularly cooks a certain type of food item, the shortcut for that food item's cooking program may appear first to the user). In some examples, if the user uses primarily advanced cooking programs, the managing device will prioritize those types of cooking programs over more basic, package-based cooking programs. In some examples, the opposite case may be true, with the managing device prioritizing basic cooking programs over the advanced programs.

Feedback from the user may also be used by the managing device to modify cooking programs. For example, if a user rates a cooking program highly (by using a review system in the managing device and/or on the cooking appliance) and gives another cooking program a low rating, the managing device may stop creating shortcuts to and/or generating the low rated program. In some examples, the managing device may prioritize the highly rated program (e.g., in a list of cooking program shortcuts, highly rated programs will be more accessibly placed). In some examples, the managing device is configured (using learning algorithms such as machine learning) to take previous user feedback into account when creating shortcuts to and/or generating cooking programs.

The cooking appliance and/or the managing device may be configured to measure the amount of a food item used during cooking and subtract the food used from the inventory of food items. In some examples, a food item is removed from the inventory by the managing device and/or cooking appliance when a cooking program using the food item is selected. For example, if a cooking program that uses a bag of french fries is selected, the managing device and/or the cooking appliance may update the inventory to remove the bag of french fries. In some examples, updating the inventory is done through the managing device and/or the cooking appliance taking an image of the food item and measuring the volume of food used. For example, if half a bag of fries is used, the cooking appliance and/or the managing device records that half a bag of fries from the inventory has been used. In some examples, the user may record the amount of food used, utilizing the cooking appliance and/or the managing device.

In some examples, accessing a feature allows a user to select, view details, modify, and/or delete features available to and/or stored on the managing device. In some examples, cooking appliances provide access to cooking programs, along with all other features described. In some examples, any information collected by the managing device is accessible. For example, information collected form the database by the managing device, which may include such things as review of a food item, may be viewed on the managing device.

Aspects of cooking program management system may be embodied as a computer method, computer system, or computer program product. Accordingly, aspects of the cooking program management system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the cooking program management system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of cooking program management system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the cooking program management system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the cooking program management system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative cooking program management system as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Cooking Program Management System

As depicted in FIG. 1, this section describes an illustrative cooking program management system 100, which is an example of the management system described in the Overview above. Cooking program management system 100 may include at least one managing device in communication with various appliances and a database via one or more computer networks, wherein the managing device is configured to ingest and utilize information from food purchase records and other sources to manage cooking programs.

As depicted in FIG. 1, a managing device 110 of system 100 is in communication with cooking appliances 140 and a database 150, and is configured to receive and gather data from food purchase records 120 (e.g., grocery store receipts). Managing device 110 may include any suitable digital device (e.g., a mobile digital device) configured to execute select applications and communicate with a computer network. For example, managing device 110 may include one or more mobile phones, tablets, desktop or laptop computers, etc. In some examples, managing device 110 is a mobile phone with an application configured to manage cooking programs. In some examples, the executable application is based in an online service (such as the cloud) and manages cooking programs by interacting with the user's device(s) through the Internet (e.g., the application connects to appliances through a home network or any suitable network connection). Managing device 110 includes an imaging system 112 (AKA an imager), such as a camera and/or a scanner, a memory 114, and processing logic 116 configured to operate managing device 110 and carry out the functions described herein. In some examples, processing logic 116 is an example of a data processing system.

Managing device 110 is configured to analyze the data and/or text of purchase records 120 to determine food items. In some examples, processing logic 116 utilizes text and/or image recognition programming, such as an artificial intelligence (AI) or machine learning program. For example, processing logic 116 may enable managing device 110 to analyze user emails and detect when a purchase record is present in the email through context (such as the information present in the email). Additionally or alternatively, the user may scan receipts or food item packaging to manually enter food items into the system. In some examples, managing device 110 is configured to recognize food item names, descriptions, and/or quantities, and compare the possible identifications to data stored in memory 114 to confirm food item identity.

In some examples, managing device 110 generates cooking programs and/or creates a shortcut to a cooking program for the identified food item. These programs or shortcuts are distributed to other devices (e.g., cooking appliances) within cooking program management system 100. In some examples, managing device 110 is configured (e.g., has machine learning algorithms) to compile information and customize instructions in cooking programs based on cooking parameters (e.g., goals of the cooking program) and create shortcuts based on prioritization parameters (e.g., which cooking programs are most likely to be used).

Managing device 110 is configured to update inventory 130 to add or modify newly identified food items present in purchase record 120. In some examples, inventory 130 includes an inventory management system configured to add recently identified items to a digital-store inventory (e.g., through scanning bar codes on item packaging). In some examples, managing device 110 accesses inventory 130 to import and/or analyze purchase records 120 and/or recently obtained food items. In some examples, inventory 130 includes a third party inventory management system in communication with managing device 110.

Managing device 110 may store in memory 114 past purchase records, along with any other information useful during managing cooking programs (such as a database of food item names and/or brands). Additionally, managing device 110 may provide, as with other information, access to the memory of purchase records and/or the inventory 130. In some examples, both the memory 114 and inventory of food items 130 are stored on managing device 110. In some examples, both memory 114 and the inventory of food items 130 may be stored in the cloud or in an internet-of-things network present in the user's place of operations.

Purchase records 120 may include any suitable record, digital or analog, of obtaining a food item or supplementing a food inventory, such as grocery receipts, digital receipts, inventory auditing records, etc. In some examples, an online store may provide (through email and/or text messaging) a digital receipt. In some examples, a human or automated cashier may provide a digital receipt along with or instead of a physical receipt. Purchase records may include an image of a written list of purchased items, images of actual purchased items, and updates from smart devices (such as enabled appliances configured to recognize food items when the items are stored, transported, or used).

Cooking program management system 100 may include one or more cooking appliances 140, which include any suitable appliance configured to cook or otherwise prepare a food item based on a customizable routine, recipe, program, or process. For example, ovens, grills, and toasters may all be considered cooking appliances. In some examples, managing device 110 and cooking appliances 140 communicate to exchange data. In some examples, the managing device connects to a cooking appliance through a home network, and transfers a cooking program to cooking appliance 140 (e.g., to a controller thereof). Any form of wired or wireless connection may be used when transferring cooking programs. In some examples, managing device 110 receives information about cooking appliances 140 including the brand and make of an appliance, the performance specifications (e.g., heat output, available functions), etc., or sufficient identifying information to retrieve such performance-related features, modes, and adjustable settings.

Cooking appliance 140 may include an imaging device, such as a camera, to collect images of food items. Images may be scanned to automatically identify food items and/or determine changes in food volume, quantity, or usage rates. In some examples, cooking appliances send information about identified food items to managing device 110. Cooking appliance 140 may have a user interface (e.g., a touch screen) through which cooking programs may be displayed and accessed. In some examples, cooking appliance(s) 140 gathers user data (e.g., what cooking programs the user regularly chooses), and transfers gathered data to managing device 110 (or to associated data stores in the network).

Cooking program management system 100 may be in communication with a database 150, disposed in managing device 110, in a remote device (e.g., a cloud server or cooking appliance 140), or some combination of these. In some examples, database 150 is stored in memory 114. Database 150 provides information to aid in the process of identifying and categorizing food items. Any information useful to managing device 110 may be stored in database 150, including but not limited to, food item types, names, brands, and/or varieties. By utilizing database 150, a wider range of information may be available to managing device 110 than what is available on purchase record 120.

Cooking program management system 100 may be configured to interface with one or more community features 160. In some examples, community features 160 are a collection of data gathered from users of the cooking program management system. In some examples, community features 160 include a web-based information sharing service including reviews of cooking programs, reviews of food items, and/or user designed custom cooking programs. Other social media features may be included, such as users assisting other users in matters of cooking through answering questions or providing useful information. The community may involve a reward program as well, awarding user prizes or money for designing cooking programs or writing reviews.

B. Using the Cooking Program Management System

Figure 2:
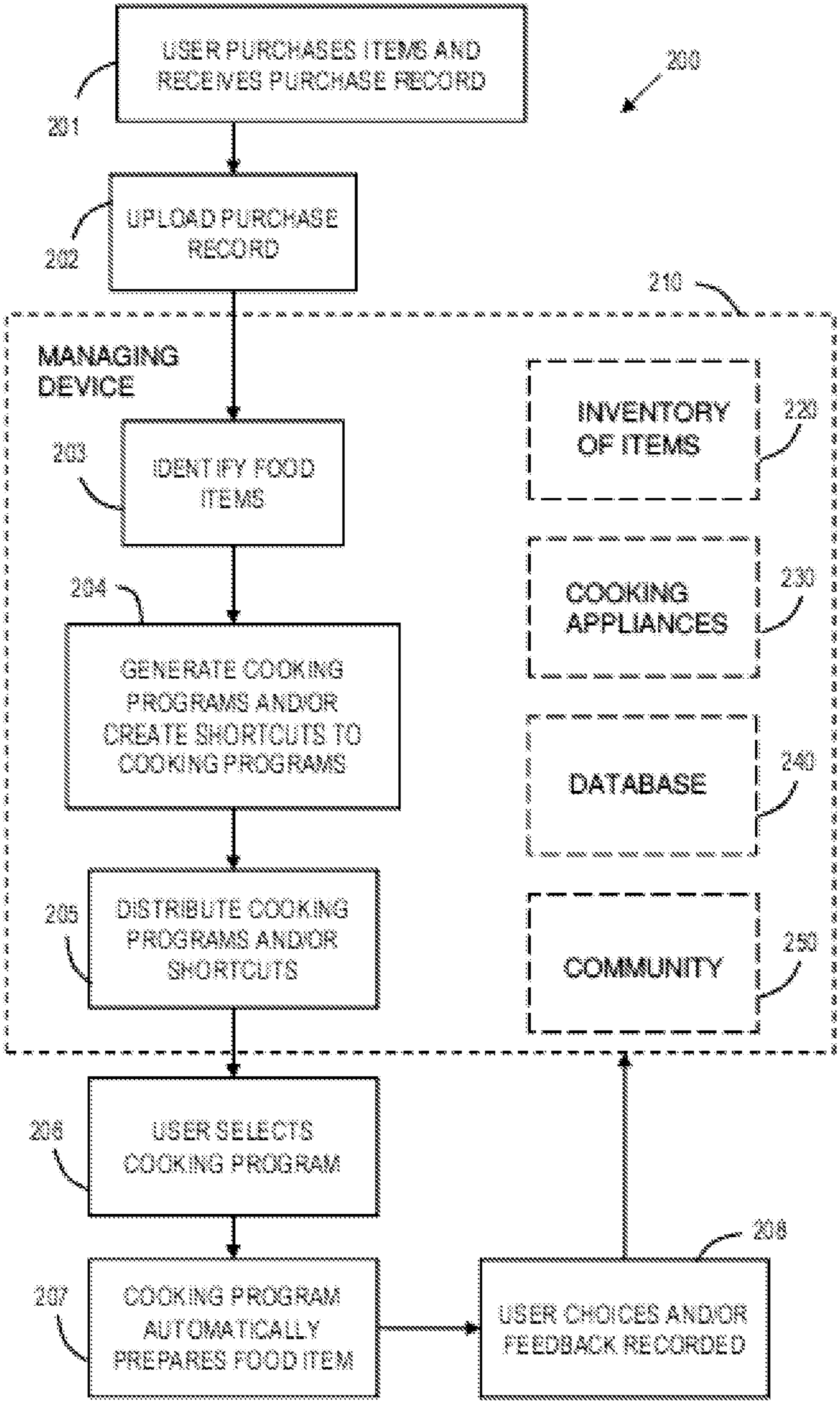
FIG. 2 is a diagram depicting steps of an illustrative method for managing cooking programs according to the present teachings.

As shown in FIG. 2, This section describes steps of an illustrative process 200 for managing and using cooking programs with a management system. Elements of cooking program management system 100 may be incorporated in process 200. Where appropriate, reference may be made to components and systems that may be used in carrying out each step. These references are for illustration and are not intended to limit the possible ways of carrying out any particular step of the process.

Process 200 depicts the operation of a cooking program management system. Although various steps of process 200 are described below and depicted in FIG. 2, the steps need not necessarily all be performed, and in some cases may be performed simultaneously or in a different order than the order shown. In some examples, more or fewer steps may be involved.

Step 201 of process 200 includes a user purchasing items and receiving a purchase record, which may be a digital or analog receipt from the selling entity.

Step 202 of process 200 includes importing or otherwise ingesting or receiving purchase records at a managing device. This managing device may include any suitable electronic device having processing logic and programming configured to carry out the steps of method 200 (e.g., managing device 210). If the purchase record is a digital receipt, the managing device may facilitate or automate a request to the store where the items were purchased, to retrieve the receipt and/or its data. In some examples, one or more cooking appliances 230 in the user's house may be configured to scan bar codes or QR codes of packaged or encoded food items. In some examples, managing device 210 is configured to scan the bar codes present on food items.

In some examples, step 202 may be semiautomated or automated. Examples of automation in this context include services, such as a store's reward program management system (which collects purchasing data to award benefits), that automatically send purchase records to managing device 210.

At step 203 of process 200, the purchase record is analyzed to identify food items and categorize identified food items. Managing device 210 may be configured to analyze the purchase record through text and/or image recognition. Information and/or context available in the purchase record may be used by managing device 210 to properly identify food. For example, an item named "Pizza" may be identified as a food item. In some examples, managing device 210 scans an image of a physical receipt and uses text recognition to identify food items. In some examples, the user may assist in identifying which items in the purchase record are food items. User assistance may be useful in situations where an non-food item is similar to a food item name (e.g., a children's toy named "silly pizza"). Using available data, such as known brand names of both food and non-food items, managing device 210 may notify the user when further information may be needed to prevent misidentification. When the correct information is supplied, managing device 210 may store that information for future reference, e.g., supplementing or adjusting the database.

During step 203 managing device 210 may incorporate additional information from cooking appliances 230, database 240, and community feature 250 to identify food items. In some examples this additional information is stored in a memory of managing device 210 and/or in database 240. Cooking appliances 230 may store information about specific brands of food items (for example, a cooking appliance may be configured to recognize food items produced by a specific food manufacturer and/or distributor). Additional information in database 240 includes but is not limited to food item types, names, the branding of the food item (what food manufacturing company produced the food item), the variety of the food item (is the food a spicy version of a base food item product) etc. By utilizing database 240, a wider range of information may be available to managing device 210 than what is available on the purchase record, enabling for a wider variety of food to be properly identified.

In some examples, community feature 250 may contain information related to food item identification provided by other users of the cooking program management system. In some examples, this includes user's responses to requests of information from managing device 210. For example, when a user provides information as to whether an item is a food item or not, this information may be shared in the community feature 250 and made available to all managing devices 210 connected to the community feature 250.

When food items have been identified, managing device 210 may update inventory 220 to include the newly purchased food items. In some examples, managing device 210 requests the user to look over identified food items to make sure no misidentifications were made.

Step 204 of process 200 includes automatically generating cooking programs and/or creating shortcuts to cooking programs, based on available food items and available appliance(s). Information used when generating cooking programs, in some examples, includes instructions provided with the food item (such as instructions printed on a package of the food item). These instructions may be imported in when the food item is identified and/or may be stored in the database, though other ways of accessing food item instructions are possible. In some examples, information regarding available cooking appliances 230 is used to generate cooking programs and/or create shortcuts to programs. In some examples, cooking appliances 230 have existing stored cooking programs, which managing device 210 may pair with identified food items to create a shortcut.

Known capabilities of cooking appliances 230 may be used by managing device 210 when creating shortcuts and/or generating cooking programs. Such capabilities may include the heating output, efficiency, and/or available functions (such as baking, frying, etc.) In some examples, managing device 210 is configured to analyze and compare the capabilities of cooking appliances to generate customized cooking programs and/or provide shortcuts to cooking programs which are specialized for a specific food item and/or a specific cooking appliance. For example, based on a cooking appliance's capabilities, managing device 210 may customize or generate a cooking program with temperature and cooking time settings fine-tuned to the cooking appliance. It may be the case that using the same cooking program on a different appliance may result in different or even inadequate results. In some examples, cooking programs are customized to utilize appliances having features known to be superior for the particular application or for the user's desired result, such as steaming or convection cooking. Information that an available cooking appliance specializes in a certain function, such as precise temperature control, may be used to create shortcuts to and/or generate more cooking programs that involve the specialized function.

In some examples, managing device 210 will change strategies and/or alert the user if no cooking appliance is able to execute the program. For example, managing device 210 may determine that air frying is required by a program, but none of the available cooking appliances has an air fryer function. Managing device 210 may use this information to instead create shortcuts and/or generate cooking programs which use functions actually available to the user.

At step 205 of process 200, managing device 210 distributes cooking programs and/or program shortcuts to cooking appliances 230. In some examples, cooking programs are sent to only the cooking appliances capable of performing the programs. The managing device may determine appliance capabilities based on information stored in the cooking appliances, the database, and/or the memory of the managing device. In some examples, managing device 210 prioritizes sending a cooking program that uses a highly rated feature of cooking appliance 230. The feature may be determined by managing device 210 by receiving or analyzing data regarding user reviews and/or manufacturer specifications. In some examples, a shortcut to a cooking program may include adding the program to a quick selection list (e.g., a list that is featured prominently when a cooking appliance is activated).

At step 206 of process 200, the user selects a cooking program. This may be done using a user interface (e.g., a screen) of available cooking appliance 230 that displays available cooking programs. In some examples, all the cooking programs are accessible on managing device 210, and the user selects a cooking program using the device. Selecting a cooking program on managing device 210 may remotely activate the cooking appliance associated with the cooking program to start the program. Cooking programs shared using community feature 250 may be selected by the user. In some examples, the managing device provides access to the custom cooking programs through a browsing feature, where the user may browse through a list of cooking programs other users have generated. In some examples, the user may import cooking programs during step 206. For example, a food distributer may have a series of ready-made meals which have a scannable bar code Or the like. When scanned, cooking programs designed for the ready-made meal may be retrieved by managing device 210 and/or cooking appliances 230.

At step 207 of process 200, the cooking program is automatically executed by the associated cooking appliance(s) 230.

At step 208 of process 200, the managing device 210 records usage and/or user feedback on the provided cooking programs. In some examples, managing device 210 sends a notification to the user and requests feedback on the executed cooking program and/or performance of the appliance or the cooking program management system. Collected feedback may be utilized to update cooking programs and/or alter which shortcuts are prioritized or highlighted. In some examples, the managing device is configured (e.g., using a machine learning model) to take previous user feedback into account when creating shortcuts and/or generating cooking programs. Such feedback may include the user's preference for certain food items, appliances, or appliance functions (e.g., the user prefers foods to be air fried when possible).

C. Illustrative Cooking Program

Figure 3:
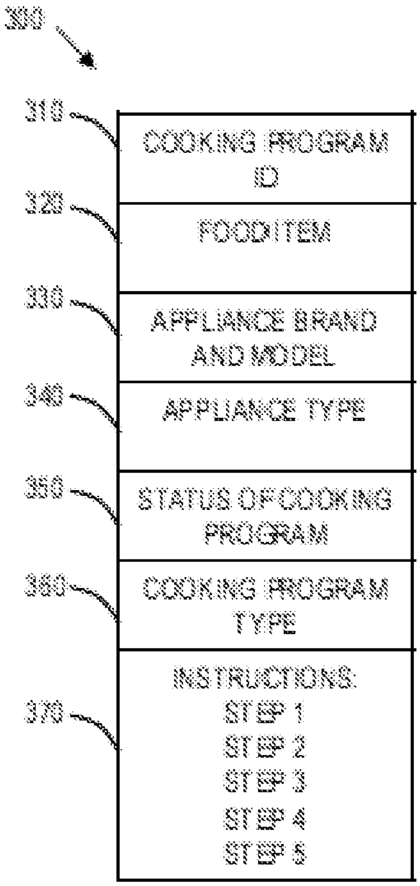
FIG. 3 is a schematic diagram of an illustrative cooking program according to the present teachings.

As shown in FIG. 3, this section describes an illustrative cooking program suitable for use with cooking program management systems of the present disclosure. Aspects of the cooking program management system described in FIG. 1 and the method described in FIG. 2 may be incorporated in the descriptions below.

FIG. 3 schematically depicts an illustrative cooking program 300 according to the present teachings. Cooking program 300 provides automated instructions for preparing a food item based on information about the food item and capabilities of a cooking appliance. Cooking program 300 as depicted in FIG. 3 may represent information displayed when a cooking program is selected and/or when details of a cooking program are requested by a user. Information contained in illustrative cooking program 300 may be gathered when the program is generated (e.g., by a manufacturer or by cooking program management system 100) and may be modified after generation.

An identifier (ID) 310 includes information used to identify the cooking program. ID 310 may include a name, an image, a reference number or code, and/or the like. In some examples, an attribute (e.g., a rating) is included in ID 310 or otherwise associated with the program. For example, cooking programs may be identified, sorted, or filtered based on user ratings (e.g., 1-star, 2-star, etc.). A user-generated ID may be assigned to a cooking program (e.g., a user may "name" a cooking program). In some examples, custom cooking programs (e.g., programs made by a user or shared by users on the community feature) may include the name of the program creator.

A food item attribute 320 of program 300 includes information about the food item to be prepared by the cooking program. In some examples, such food item information contains the name of the food item, the brand and variety of the food item, the amount or quantity, and/or an image of the food item. One or more cooking requirements may be contained in food item attribute 320. For example, if a food item requires a minimum internal temperature to be considered safe to eat, the minimum temperature may be included in food item attribute 320.

An appliance attribute 330 includes information about the appliance(s) associated with or suitable for the cooking program. Appliance attribute 330 may include appliance brand, model, specifications, performance metrics, etc. An appliance category 340 includes information about the functional capability of the appliance, such as whether the appliance can bake, grill, fry, etc.

A status 350 provides details about the cooking program, including but not limited to whether the program is approved or certified (official instructions for cooking the food item given by the food manufacturer) or a rating of the cooking program (such as the community or user rating).

A program type 360 includes information identifying the general program category, such as whether cooking program 300 is basic (e.g., general instructions for generic foods), prescribed (e.g., based on food item package instructions), advanced (e.g., involving multiple phases or steps and/or having a goal besides basic cooking), or custom (e.g., community or user-generated or modified). Other cooking program types are possible, and a given cooking program may have multiple type classifications (e.g., a program that is both advanced and custom).

A set of instructions 370 includes the step-by-step process of the cooking program. In some examples, instructions 370 include an automated program that controls the cooking appliance during the cooking process. In some examples, instructions may be broken up into phases. As a purely illustrative example, to cook a frozen pizza, step 1 may include preheating an oven to 350 degrees F.; step 2 requests that the user place the pizza in the oven; step 3 sets a timer for 15 minutes; and step 4 includes alerting the user that the timer is done (and/or almost done). Advanced cooking programs may have additional steps. Using another illustrative example, an advanced cooking program may include step 1, preheating to 300 F; step 2, convection cook at 500 degrees for 10 minutes; step 3, let pizza rest for 2 minutes; step 4, broil for 2 minutes; and step 5, signal user that the pizza is ready. Although FIG. 3 depicts instructions 370 as having five steps, any number of steps may be contained in instructions 370.

Multiple programs may be viewed simultaneously or sequentially in a format similar to that of FIG. 3. Information used to generate cooking program 300 may be used to organize and/or prioritize two or more cooking programs 300.

D. Methods of Using or Operating a Cooking Program Management System

Figure 4:
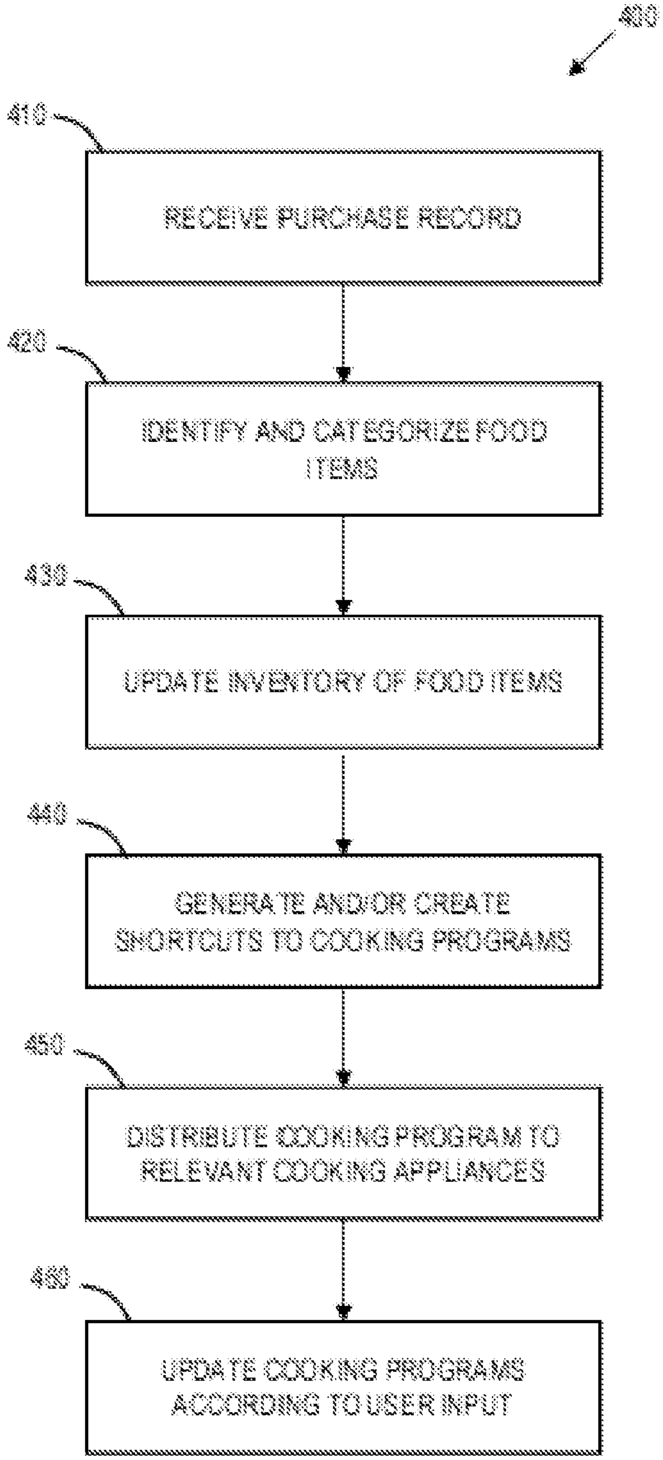
FIG. 4 is a flowchart depicting steps of an illustrative first method for a cooking program management system.
Figure 5:
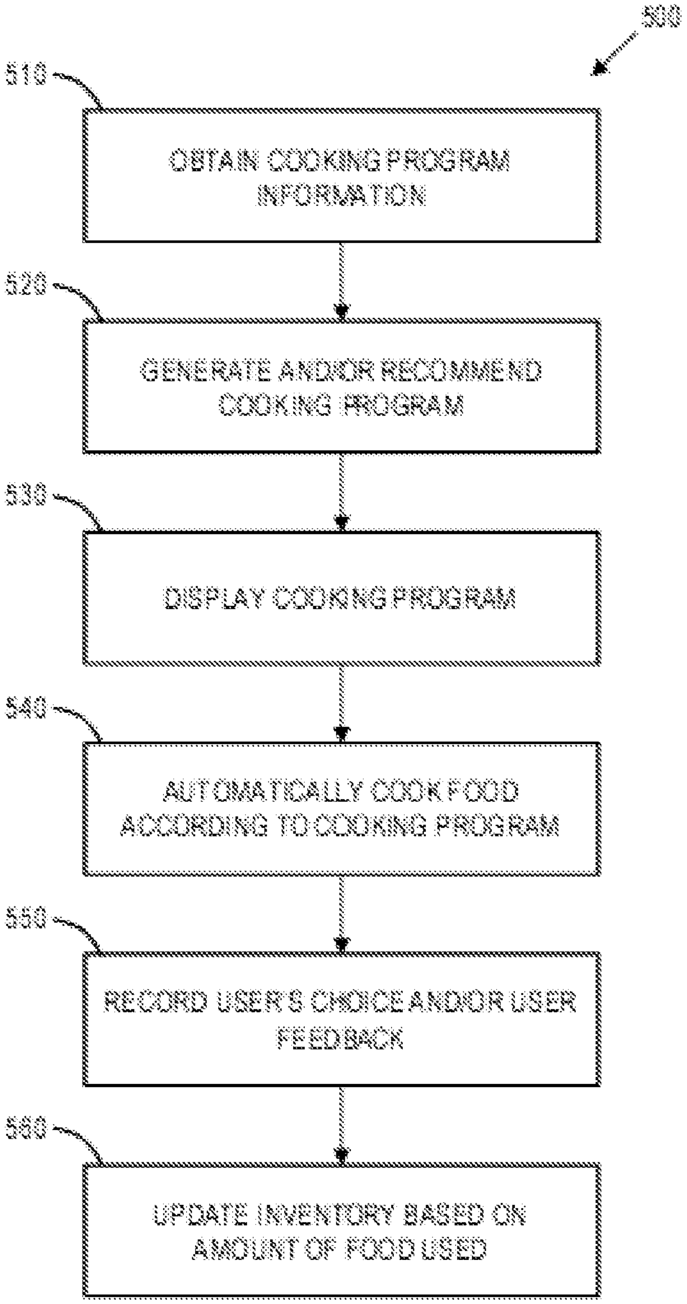
FIG. 5 is a flowchart depicting steps of an illustrative second method for a cooking program management system.
Figure 6:
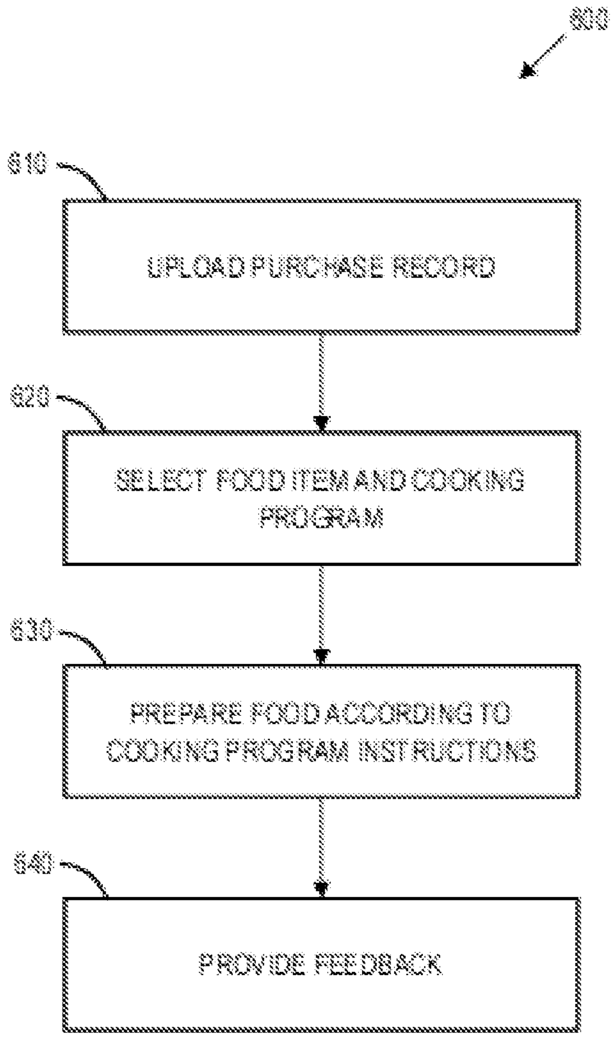
FIG. 6 is a flowchart depicting steps of an illustrative third method for a cooking program management system.

This section describes steps of several illustrative methods for the use and operation of a cooking program management system of the present disclosure; see FIGS. 4, 5, and 6.

FIG. 4 is a flowchart illustrating steps performed in a first method 400 and may not recite the complete process or all the steps of the method. Although various steps of method 400 are described below and depicted in FIG. 4, the steps need not necessarily all be performed, and in some cases may be performed simultaneously or in a different order than the order shown.

At step 410 of method 400, a managing device (e.g., managing device 110) receives purchasing records. In some examples, this process is partially or fully automated, wherein the managing device is in communication with one or more services of a store or seller, such as a cashier system and/or a rewards program manager where purchasing data is collected. Purchase records may be received by the managing device in real time, or near real time. In some examples, managing device may be configured to analyze communications (e.g., emails, SMS texts, and other messages) to recognize purchase record information. In some examples, individual items may be imported into the managing device automatically, be way of object recognition and/or encoding indicia (e.g., barcodes). For example, a device in the user's place of operation, such as a refrigerator, may be configured to scan newly added items and report the items to the managing device.

At step 420 of method 400, the purchase record information is analyzed to identify food items and categorize the identified food items. The managing device receives data directly and/or analyzes the purchase record using text and/or image recognition. For example, the managing device may scan an image of a physical receipt and use text recognition to identify food items based on the item names present on the receipt.

In some examples, the identified food items may be further organized by the managing device into food categories, such as relevant and non-relevant categories. The relevant category includes all food items that may be cooked using a cooking program. The non-relevant category includes the food items have no need for a cooking program (e.g., food that does not need to be cooked and/or prepared). Managing device may be configured to access and/or have stored data about food items and be further configured to compare identified food items to food item data.

At step 430 of method 400, an inventory of food items is updated. The inventory of food items may include a list of food items available to the user. In some examples, any time a food item is purchased or used, the inventory of food items is updated (i.e., incremented or decremented) to maintain an accurate list of available food items. All food items may be added to the inventory, regardless of whether a food item is relevant for cooking programs. Information collected about food items may be sent to the inventory, including branding, variety, and/or quantity.

At step 440 of method 400, cooking programs are modified or generated and/or shortcuts are created to selected cooking programs. In some examples, manufacturer instructions, e.g., corresponding to those present on the packaging, may be used by the managing device to generate a cooking program and/or provide a shortcut to a cooking program. In some examples, the managing device retrieves the instructions through scanning an image of the food item and/or analyzing the text of the instructions. In some examples the managing device locates the instructions digitally through the identified food item by using the identification to retrieve related information (for example, certain food items may have instructions stored on the managing device and once identified, the managing device matches the food item with its instructions).

During this step, more advanced cooking programs may be generated. These advanced cooking programs may utilize further relevant information from the database, from cooking appliances, and/or from a community feature. In some examples, cooking program creation or modification is partly determined by the capabilities of the available cooking appliances.

At step 450 of method 400, the cooking programs and/or shortcuts of step 440 are distributed to one or more cooking appliances available to the user. In some examples, the cooking programs distributed to each appliance may be a combination of advanced, basic, and user generated cooking programs. In some examples, cooking programs are accessible using both the managing device and the cooking appliance.

At step 460 of method 400 usage data and/or user feedback are recorded. For example, user behavior may be analyzed to organize the program shortcuts to place more frequently used cooking programs in an easily accessible location. In some examples, if the user uses primarily advanced cooking programs, those types of cooking programs may be prioritized over more basic, package-based cooking programs. Feedback from the user may be used to modify cooking programs. For example, if a user rates a cooking program highly (e.g., by using a review system in the managing device and/or on the cooking appliance) and gives another cooking program a lower rating, the managing device may stop or reduce the occurrence of the lower rated program.

FIG. 5 is a flowchart illustrating steps performed in a second method 500 and may not recite the complete process or all steps of the method. Although various steps of method 500 are described below and depicted in FIG. 5, the steps need not necessarily all be performed, and in some cases may be performed simultaneously or in a different order than the order shown.

Step 510 of method 500 includes receiving cooking program information at a cooking appliance. In some examples, cooking appliances are configured to automatically update available cooking programs and program shortcuts whenever new cooking program information is received.

At optional step 520 of method 500, cooking programs are generated, modified, and/or recommended. For example, a cooking appliance may be configured to detect and compensate for changes in heat output and may be further configured to modified cooking programs to compensate.

Step 530 of method 500 includes displaying one or more cooking programs for review and selection by the user. This display may be accomplished using any suitable interface, on any accessible device in communication with the cooking appliance.

At step 540 of method 500, a cooking appliance automatically cooks a food item according to the cooking program's instructions. In some examples, multiple cooking appliances or modes may be utilized during the process of one cooking program.

At step 550 of method 500, the user's feedback on the cooking program is recorded. The managing device and/or cooking appliances may request feedback to be provided. In some examples, the user is sent a message (e.g., a text message) for feedback on the performance of the cooking program. In some examples, actual usage information is recorded. For example, if a user consistently chooses one cooking program or one type of program over others, this may be recorded as a known preference.

Step 560 of method 500 includes automatically reporting the amount of each food item used and updating the inventory. For example, a cooking appliance may be configured to photograph and/or weigh food items being cooked to estimate the amount of food used. The inventory is updated to reflect the change in available food items.

FIG. 6 is a flowchart illustrating steps performed in a third method 600 and may not recite the complete process or all the steps of the method. Although various steps of method 600 are described below and depicted in FIG. 6, the steps need not necessarily all be performed, and in some cases may be performed simultaneously or in a different order than the order shown.

At step 610 of method 600 a purchase record is imported to the cooking program management system. The cooking program management system may be configured to send a notification to the user to upload purchase records whenever a purchasing transaction has taken place.

At step 620 of method 600, a food item and a cooking program are selected by the user. Selection may be done on any device in communication with the overall cooking program management system. Information related to particular food items selected may be utilized to modify one or more cooking programs.

At step 630 of method 600, instructions are provided to the user to perform any preparation of the selected food item before cooking. For example, if the food item may need to be washed, unpackaged, or peeled. Instructions may include written instructions, videos, and/or community provided guidance (from a community feature).

At step 640 of method 600, feedback is provided by the user to the system. In some examples, the user may rate aspects of the cooking program (e.g., speed, quality, simplicity). Feedback may be shared with any component of the cooking program management system.

The various steps of methods 400, 500, and 600 may be performed in conjunction with each other. In some examples, steps of the different methods describe different aspects of a particular functionality present in two or more of the methods.

E. Illustrative User Interface

This section describes an illustrative cooking program user interface (UI) suitable for use with systems and methods described above, see FIGS. 7 and 8. These and other interfaces may be available on one or more devices of the system.

Figure 7:
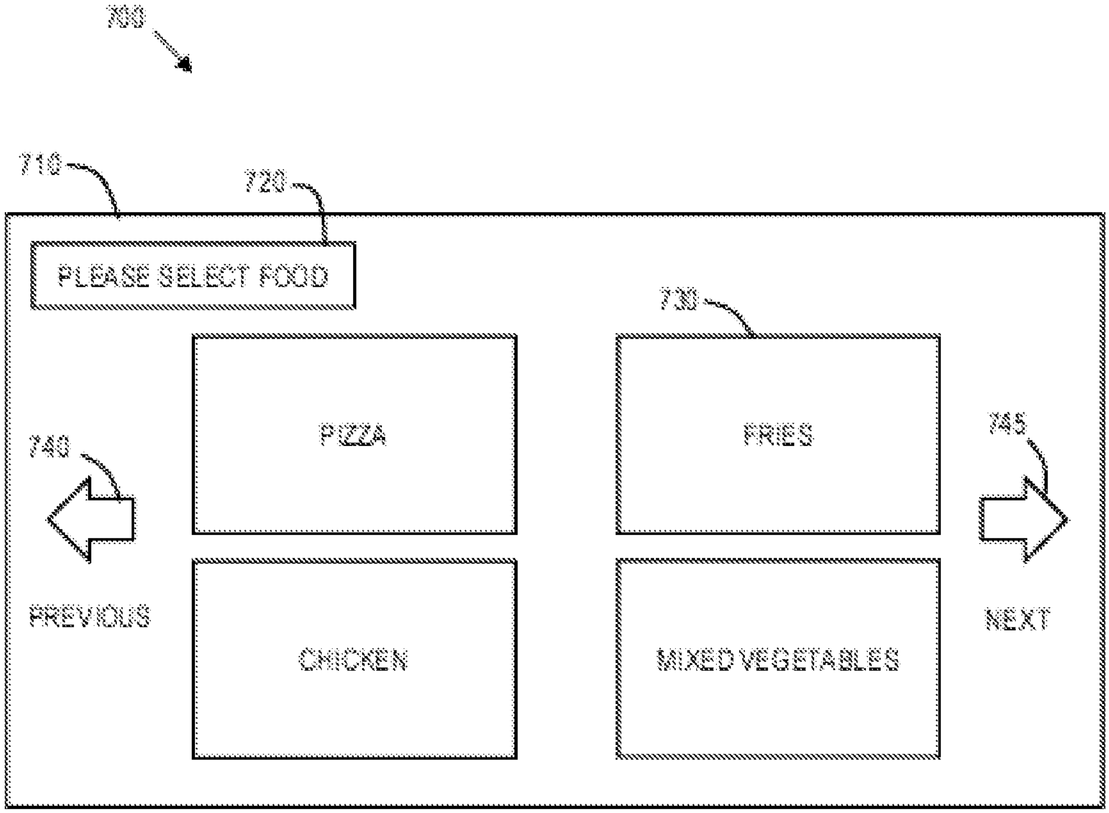
FIG. 7 is a schematic diagram of an illustrative food item selection interface as described herein.
Figure 8:
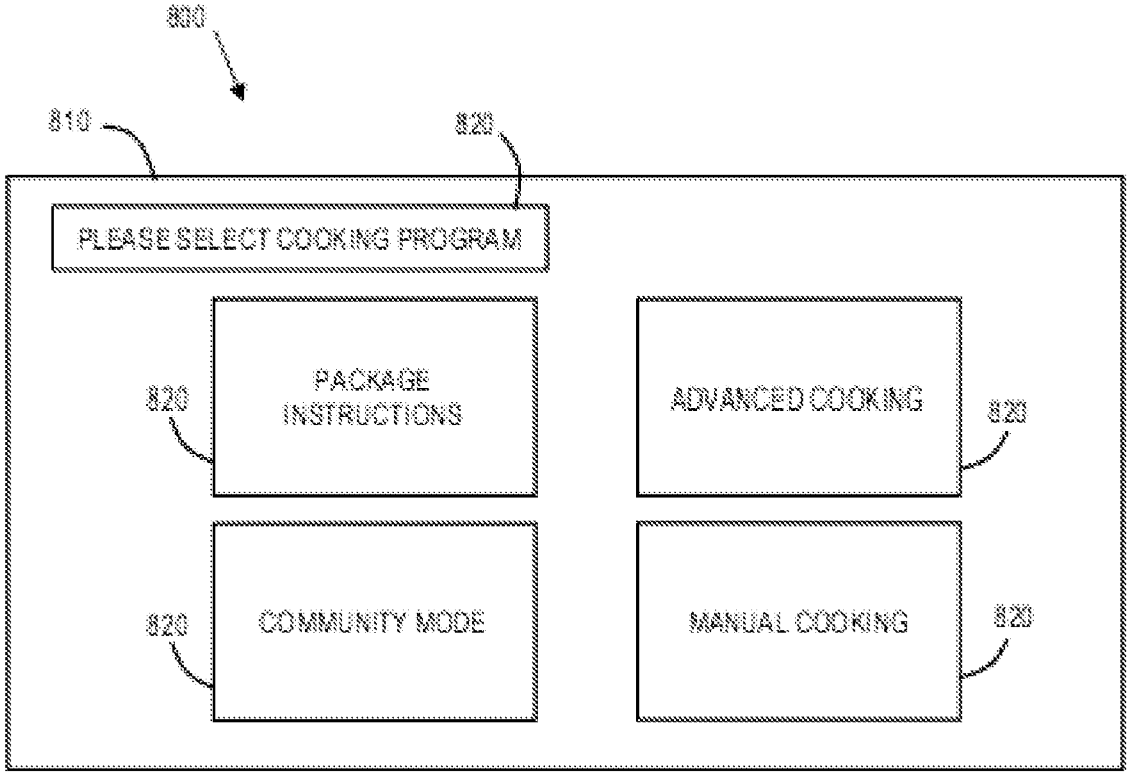
FIG. 8 is a schematic diagram of an illustrative cooking program selection interface as described herein.

FIGS. 6 and 7 depict user interfaces for food items and cooking programs, respectively. A food item UI 700, as depicted in FIG. 6, includes a screen 710 which displays a notification tab 720, food items 730, and menu navigation buttons 740 and 745. In some examples, when one of food item icons 730 is tapped or pressed (or otherwise activated), a cooking program UI 800 is displayed. UI 800 displays cooking programs associated with the selected food item. Food item icons 730 may include images and/or text to depict the related food item.

In some examples, recently chosen food items are displayed in a preferred location on the UI. In some examples, preferred icons are chosen by the user, such as by designating certain food item icons 730 as favorites.

FIG. 7 depicts cooking program UI 800. In some examples, cooking program user interface 800 appears in response to selection of a food item. In some examples, a cooking program is selected first, resulting in a set of potential food items that may be prepared. UI 800 displays a notification tab 820, which details that the purpose of the displayed screen. In some examples, available cooking programs available include basic cooking programs 830, advanced cooking programs 840, community-sourced cooking programs 850, and a UI interface item (e.g., a button) to select manual cooking 860. In some examples, other options may be displayed, such as a favorites menu.

F. Illustrative Data Processing System

Figure 9:
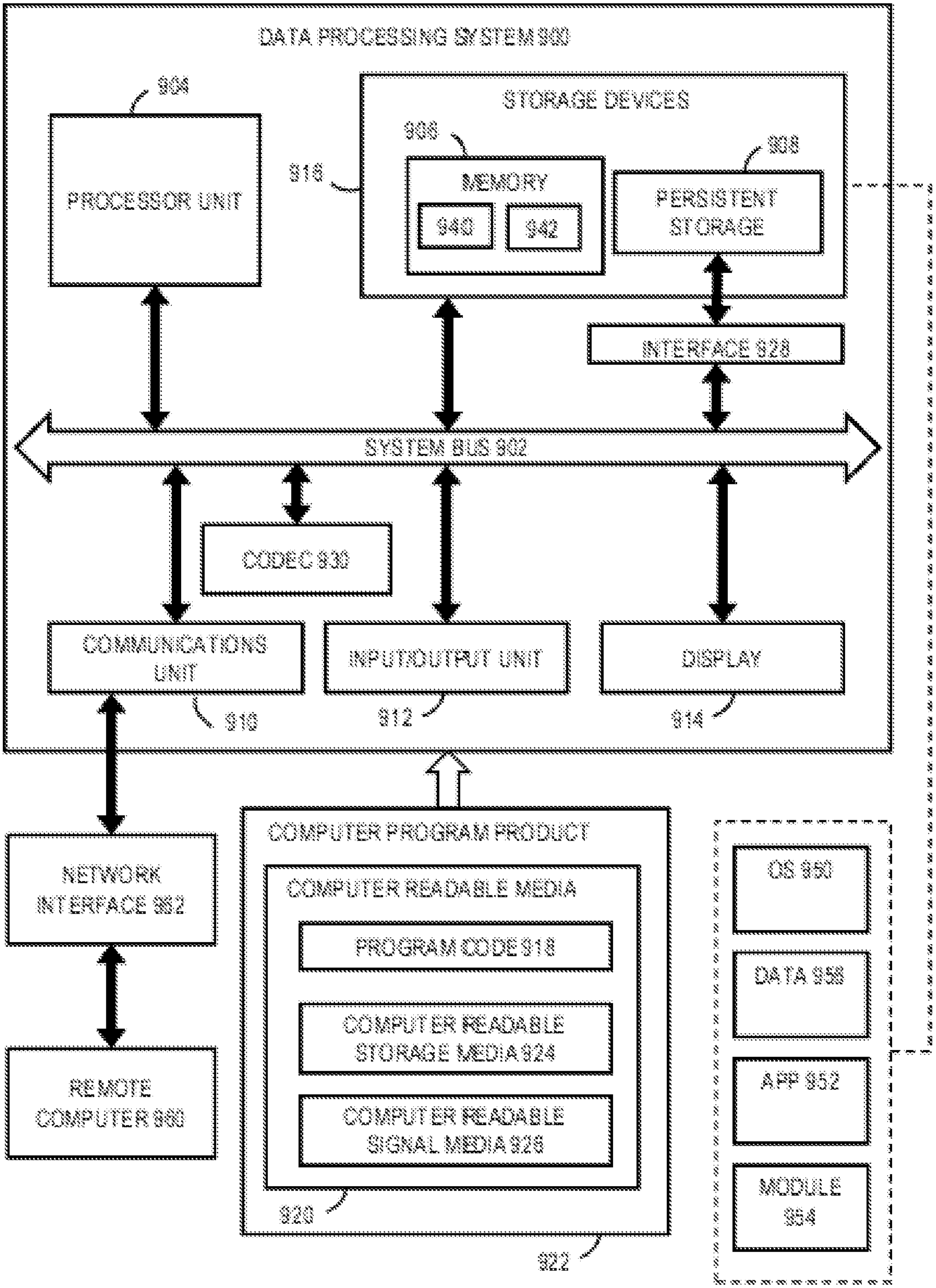
FIG. 9 is a schematic diagram of an illustrative data processing system suitable for use with aspects of the present disclosure.

As shown in FIG. 9, this example describes a data processing system 900 (also referred to as a computer, computing system, and/or computer system) in accordance with aspects of the present disclosure. In this example, data processing system 900 is an illustrative data processing system suitable for implementing aspects of the cooking program management system. More specifically, in some examples, devices that are embodiments of data processing systems (e.g., smartphones, tablets, personal computers) may be accessed to provide data, to receive data and/or notifications, or to control and/or manage a device in use by cooking program management system 100 to manage cooking programs as described in process 200 and methods 400, 500, and 600. Managing device 110 (e.g., the processing logic of the managing device) may include a data processing system to analyze text and/or images and to create shortcuts to and/or generate cooking programs. Other components in cooking program management system 100, such as cooking appliances, may include data processing systems to receive and execute cooking programs, as well as to control features and functions of the appliance (e.g., by way of an electronic controller).

In this illustrative example, data processing system 900 includes a system bus 902 (also referred to as communications framework). System bus 902 may provide communications between a processor unit 904 (also referred to as a processor or processors), a memory 906, a persistent storage 908, a communications unit 910, an input/output (I/O) unit 912, a codec 930, and/or a display 914. Memory 906, persistent storage 908, communications unit 910, input/output (I/O) unit 912, display 914, and codec 930 are examples of resources that may be accessible by processor unit 904 via system bus 902.

Processor unit 904 serves to run instructions that may be loaded into memory 906. Processor unit 904 may comprise a number of processors, a multi-processor core, and/or a particular type of processor or processors (e.g., a central processing unit (CPU), graphics processing unit (GPU), etc.), depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device may include any suitable hardware capable of storing information (e.g., digital information), such as data, program code in functional form, and/or other suitable information, either on a temporary basis or a permanent basis.

Storage devices 916 also may be referred to as computer-readable storage devices or computer-readable media. Memory 906 may include a volatile storage memory 940 and a non-volatile memory 942. In some examples, a basic input/output system (BIOS), containing the basic routines to transfer information between elements within the data processing system 900, such as during start-up, may be stored in non-volatile memory 942. Persistent storage 908 may take various forms, depending on the particular implementation.

Persistent storage 908 may contain one or more components or devices. For example, persistent storage 908 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 908 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 908 to system bus 902, a removable or non-removable interface is typically used, such as interface 928.

Input/output (I/O) unit 912 allows for input and output of data with other devices that may be connected to data processing system 900 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 904 through system bus 902 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 900 and to output information from data processing system 900 to an output device. One or more output adapters may be provided for certain output devices (e.g., monitors, speakers, and printers, among others) which require special adapters. Suitable output adapters may include, e.g., video and sound cards that provide a means of connection between the output device and system bus 902. Other devices and/or systems of devices may provide both input and output capabilities, such as remote computer(s) 960. Display 914 may include any suitable human-machine interface or other mechanism configured to display information to a user, e.g., a CRT, LED, or LCD monitor or screen, etc.

Communications unit 910 refers to any suitable hardware and/or software employed to provide for communications with other data processing systems or devices. While communication unit 910 is shown inside data processing system 900, it may in some examples be at least partially external to data processing system 900. Communications unit 910 may include internal and external technologies, e.g., modems (including regular telephone grade modems, cable modems, and DSL modems), ISDN adapters, and/or wired and wireless Ethernet cards, hubs, routers, etc. Data processing system 900 may operate in a networked environment, using logical connections to one or more remote computers 960. A remote computer(s) 960 may include a personal computer (PC), a server, a router, a network PC, a workstation, a microprocessor-based appliance, a peer device, a smart phone, a tablet, another network note, and/or the like. Remote computer(s) 960 typically include many of the elements described relative to data processing system 900. Remote computer(s) 960 may be logically connected to data processing system 900 through a network interface 962 which is connected to data processing system 900 via communications unit 910. Network interface 962 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 930 may include an encoder, a decoder, or both, comprising hardware, software, or a combination of hardware and software. Codec 930 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 930 is depicted as a separate component, codec 930 may be contained or implemented in memory, e.g., non-volatile memory 942.

Non-volatile memory 942 may include read only memory (ROM), programmable ROM (PROM), electrically programmable ROM (EPROM), electrically erasable programmable ROM (EEPROM), flash memory, and/or the like, or any combination of these. Volatile memory 940 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 916, which are in communication with processor unit 904 through system bus 902. In these illustrative examples, the instructions are in a functional form in persistent storage 908. These instructions may be loaded into memory 906 for execution by processor unit 904. Processes of one or more embodiments of the present disclosure may be performed by processor unit 904 using computer-implemented instructions, which may be located in a memory, such as memory 906.

These instructions are referred to as program instructions, program code, computer usable program code, or computer-readable program code executed by a processor in processor unit 904. The program code in the different embodiments may be embodied on different physical or computer-readable storage media, such as memory 906 or persistent storage 908. Program code 918 may be located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may comprise computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a non-transitory, physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is media that can be touched by a person.

Alternatively, program code 918 may be transferred to data processing system 900, e.g., remotely over a network, using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer-readable signal media 926 for use within data processing system 900. For instance, program code stored in a computer-readable storage medium in a server data processing system may be downloaded over a network from the server to data processing system 900. The computer providing program code 918 may be a server computer, a client computer, or some other device capable of storing and transmitting program code 918.

In some examples, program code 918 may comprise an operating system (OS) 950. Operating system 950, which may be stored on persistent storage 908, controls and allocates resources of data processing system 900. One or more applications 952 take advantage of the operating system's management of resources via program modules 954, and program data 956 stored on storage devices 916. OS 950 may include any suitable software system configured to manage and expose hardware resources of computer 900 for sharing and use by applications 952. In some examples, OS 950 provides application programming interfaces (APIs) that facilitate connection of different type of hardware and/or provide applications 952 access to hardware and OS services. In some examples, certain applications 952 may provide further services for use by other applications 952, e.g., as is the case with so-called "middleware." Aspects of present disclosure may be implemented with respect to various operating systems or combinations of operating systems.

The different components illustrated for data processing system 900 are not meant to provide architectural limitations to the manner in which different embodiments may be implemented. One or more embodiments of the present disclosure may be implemented in a data processing system that includes fewer components or includes components in addition to and/or in place of those illustrated for computer 900. Other components shown in FIG. 9 can be varied from the examples depicted. Different embodiments may be implemented using any hardware device or system capable of running program code. As one example, data processing system 900 may include organic components integrated with inorganic components and/or may be comprised entirely of organic components (excluding a human being). For example, a storage device may be comprised of an organic semiconductor.

In some examples, processor unit 904 may take the form of a hardware unit having hardware circuits that are specifically manufactured or configured for a particular use, or to produce a particular outcome or progress. This type of hardware may perform operations without needing program code 918 to be loaded into a memory from a storage device to be configured to perform the operations. For example, processor unit 904 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 918) may be implemented as hardware, e.g., by specifying an FPGA configuration using a hardware description language (HDL) and then using a resulting binary file to (re)configure the FPGA.

In another example, data processing system 900 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, system bus 902 may comprise one or more buses, such as a system bus or an input/output bus. Of course, the bus system may be implemented using any suitable type of architecture that provides for a transfer of data between different components or devices attached to the bus system. System bus 902 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in system bus 902.

G. Illustrative Distributed Data Processing System

Figure 10:
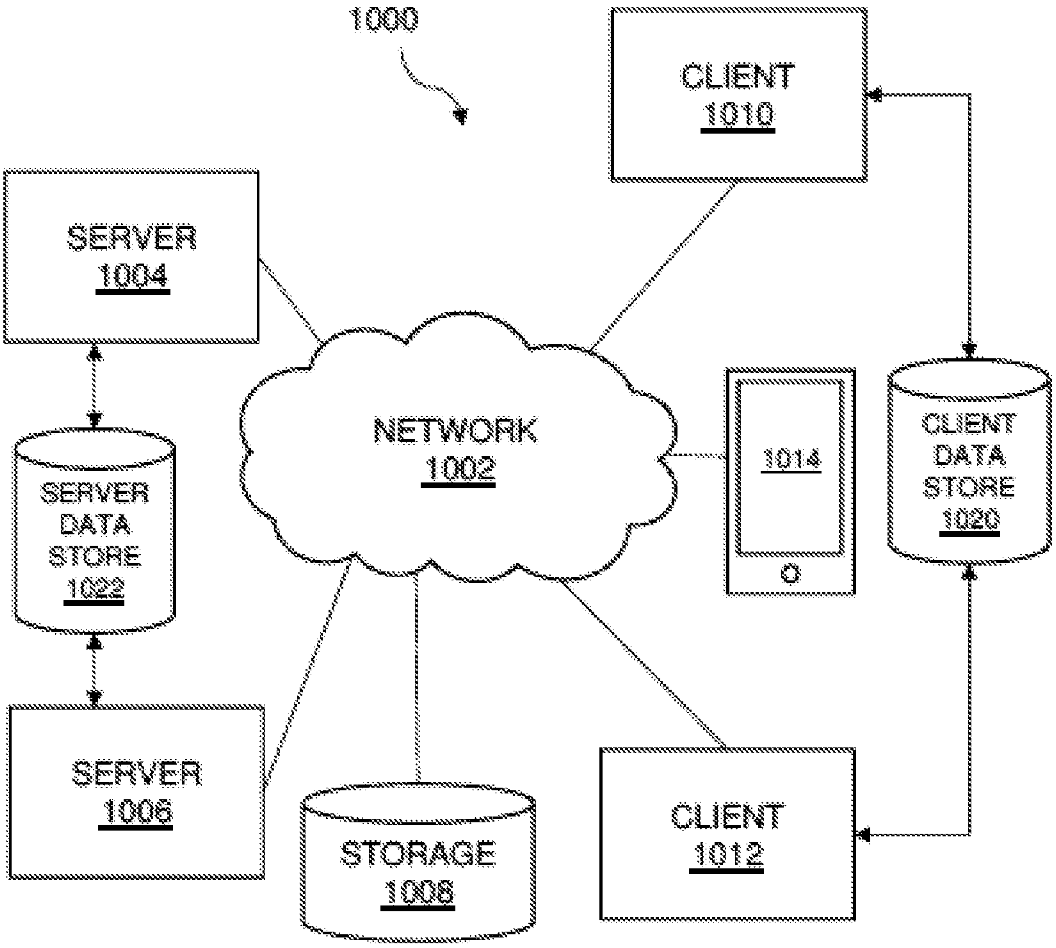
FIG. 10 is a schematic diagram of an illustrative distributed data processing system suitable for use with aspects of the present disclosure.

As shown in FIG. 10, this example describes a general network data processing system 1000, interchangeably termed a computer network, a network system, a distributed data processing system, or a distributed network, aspects of which may be included in one or more illustrative embodiments of the cooking program management system of the present disclosure. For example, devices and/or appliances involved with recording data related to purchasing and/or maintaining an inventory may be in network communication with a device of the cooking program management system. In some examples, cooking program management system 100 is in network communication with cooking appliances 140 and a database 150 through a network such as a home network. Additionally, cooking appliances 140 may be in network communication with other cooking appliances 140 and/or managing device 110 so that cooking program management system 100 may collect data and/or distribute cooking programs.

It should be appreciated that FIG. 10 is provided as an illustration of one implementation and is not intended to imply any limitation with regard to environments in which different embodiments may be implemented. Many modifications to the depicted environment may be made.

Network system 1000 is a network of devices (e.g., computers), each of which may be an example of data processing system 900, and other components. Network data processing system 1000 may include network 1002, which is a medium configured to provide communications links between various devices and computers connected within network data processing system 1000. Network 1002 may include connections such as wired or wireless communication links, fiber optic cables, and/or any other suitable medium for transmitting and/or communicating data between network devices, or any combination thereof.

In the depicted example, a first network device 1004 and a second network device 1006 connect to network 1002, as do one or more computer-readable memories or storage devices 1008. Network devices 1004 and 1006 are each examples of data processing system 900, described above. In the depicted example, devices 1004 and 1006 are shown as server computers, which are in communication with one or more server data store(s) 1022 that may be employed to store information local to server computers 1004 and 1006, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 1010 and 1012 and/or a client smart device 1014, may connect to network 1002. Each of these devices is an example of data processing system 900, described above regarding FIG. 9. Client electronic devices 1010, 1012, and 1014 may include, for example, one or more personal computers, network computers, and/or mobile computing devices such as personal digital assistants (PDAs), smart phones, handheld gaming devices, wearable devices, and/or tablet computers, and the like. In the depicted example, server 1004 provides information, such as boot files, operating system images, and applications to one or more of client electronic devices 1010, 1012, and 1014. Client electronic devices 1010, 1012, and 1014 may be referred to as "clients" in the context of their relationship to a server such as server computer 1004. Client devices may be in communication with one or more client data store(s) 1020, which may be employed to store information local to the clients (e.g., cookie(s) and/or associated contextual information). Network data processing system 1000 may include more or fewer servers and/or clients (or no servers or clients), as well as other devices not shown.

In some examples, first client electric device 1010 may transfer an encoded file to server 1004. Server 1004 can store the file, decode the file, and/or transmit the file to second client electric device 1012. In some examples, first client electric device 1010 may transfer an uncompressed file to server 1004 and server 1004 may compress the file. In some examples, server 1004 may encode text, audio, and/or video information, and transmit the information via network 1002 to one or more clients.

Client smart device 1014 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 1000 may be stored in or on a computer-readable storage medium, such as network-connected storage device 1008 and/or a persistent storage 908 of one of the network computers, as described above, and may be downloaded to a data processing system or other device for use. For example, program code may be stored on a computer-readable storage medium on server computer 1004 and downloaded to client 1010 over network 1002, for use on client 1010. In some examples, client data store 1020 and server data store 1022 reside on one or more storage devices 1008 and/or 908.

Network data processing system 1000 may be implemented as one or more of different types of networks. For example, system 1000 may include an intranet, a local area network (LAN), a wide area network (WAN), or a personal area network (PAN). In some examples, network data processing system 1000 includes the Internet, with network 1002 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 1002 may be referred to as a "cloud." In those examples, each server 1004 may be referred to as a cloud computing node, and client electronic devices may be referred to as cloud consumers, or the like. FIG. 10 is intended as an example, and not as an architectural limitation for any illustrative embodiments.

H. Illustrative Combinations and Additional Examples

This section describes additional aspects and features of grocery data application, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A computer-implemented method for managing cooking programs associated with one or more cooking appliances, the method comprising:

- receiving, at an electronic device in communication with an electronic controller of a cooking appliance associated with a user of the device, a food purchase record including information relating to a food item;
- determining, based on the information relating to the food item, one or more cooking programs configured to be executed by the electronic controller to prepare the food item using the cooking appliance;
- communicating, by the electronic device, instructions corresponding to the one or more cooking programs to the cooking appliance; and
- causing, using processing logic of the electronic device, the cooking appliance to display indicia indicating a shortcut to the one or more cooking programs on a user interface of the cooking appliance.

A1. The method of A0, further comprising executing a selected one of the cooking programs to process the food item using the cooking appliance.

A2. The method of A0 or A1, wherein receiving the food purchase record includes extracting the information relating to the food item from the purchase record using a text recognition program executed by processing logic of the electronic device.

A3. The method of any one of paragraphs A0 through A2, wherein receiving the food purchase record includes performing image recognition of the food item using processing logic of the electronic device.

A4. The method of any one of paragraphs A0 through A3, wherein determining the one or more cooking programs is performed based at least in part on one or more features of the cooking appliance.

A5. The method of any one of paragraphs A0 through A4, wherein the electronic device is in communication with a second cooking appliance associated with the user, and the one or more cooking programs are based on features known to be present in one or both of the cooking appliances.

A6. The method of any one of paragraphs A0 through A5, wherein determining the one or more cooking programs includes modifying at least one existing cooking program.

A7. The method of A6, wherein the electronic device and the electronic controller are part of a distributed computer network, and the at least one existing cooking program is stored in a memory of the computer network.

A8. The method of any one of paragraphs A0 through A7, wherein receiving the food purchase record includes receiving a digital version of the food purchase record from a seller of the food item.

A9. The method of any one of paragraphs A0 through A8, wherein the food item is a packaged food item having cooking instructions disclosed on a package, and a first one of the one or more cooking programs comprises instructions corresponding to the cooking instructions disclosed on the package.

A10. The method of any one of paragraphs A0 through A9, further comprising:

receiving, at the electronic device, cooking program information generated by a user community;

wherein determining the one or more cooking programs is based at least in part on the information generated by the user community.

A11. The method of any one of paragraphs A0 through A10, further comprising:

automatically updating a food inventory based on the food purchase record.

B0. A system for preparing a food product, the system comprising:

a cooking appliance having an electronic controller and a first user interface, wherein the electronic controller is configured to display a plurality of cooking programs for selection by a user, and to execute a selected one of the cooking programs based on user input;

a personal electronic device in communication with the cooking appliance, wherein the personal electronic device includes a second user interface and processing logic configured to:

receive information relating to available food preparation features of the cooking appliance and information relating to a food product;

determine one or more corresponding cooking programs configured to prepare the food product using one or more of the available features of the cooking appliance;

communicate the one or more corresponding cooking programs to the cooking appliance; and cause the cooking appliance to display indicia on the first user interface of the cooking appliance, indicating respective shortcuts configured to execute the one or more corresponding cooking programs.

B1. The system of B0, wherein the processing logic of the personal electronic device is further configured to extract the information relating to the food product from a purchase record using a text recognition program.

B2. The system of B0 or B1, further comprising:

a second cooking appliance in communication with the personal electronic device;

wherein the processing logic of the personal electronic device is further configured to determine the one or more corresponding cooking programs based at least in part on features available in one or both of the cooking appliances.

B3. The system of any one of paragraphs B0 through B2, wherein determining the one or more corresponding cooking programs includes automatically modifying at least one existing cooking program.

B4. The system of B3, wherein the personal electronic device and the cooking appliance are part of a distributed computer network, and the at least one existing cooking program is stored in a memory of the computer network.

B5. The system of any one of paragraphs B0 through B4, wherein the processing logic of the personal electronic device is further configured to receive the information relating to the food product by receiving a digital version of a food purchase record from a seller of the food product.

B6. The system of any one of paragraphs B0 through B5, wherein the food product is a packaged food item having cooking instructions disclosed on a package, and a first one of the plurality of cooking programs comprises instructions corresponding to the cooking instructions disclosed on the package.

B7. The system of any one of paragraphs B0 through B6, wherein the processing logic of the personal electronic device is further configured to:

automatically update a food inventory database, based on the information relating to the food product;

wherein the information relating to the food product includes at least an identifier and a quantity.

Advantages, Features, and Benefits

The different embodiments and examples of the cooking program management system described herein provide several advantages over known solutions. For example, illustrative embodiments and examples described herein use grocery purchase data to automatically create shortcuts to automated cooking programs on a user's appliance(s) to increase convenience when cooking.

Additionally, and among other benefits, illustrative embodiments and examples described herein allow automatic organization of food inventory in a user's household.

Additionally, and among other benefits, illustrative embodiments and examples described herein allow an improvement in cooking performance by analyzing and pairing cooking appliances to cooking programs to create customized cooking programs.

Additionally, and among other benefits, illustrative embodiments and examples described herein help acquaint a user with the full functionality of an appliance, and allow easier access to available cooking modes and/or functions of the user's specific cooking appliances.

Additionally, and among other benefits, illustrative embodiments and examples described herein provide a method for specializing cooking programs based on specific food items, including food brands.

Additionally, and among other benefits, illustrative embodiments and examples described herein improve the managing of cooking programs and provide a method of organizing the increasing number of cooking programs to put the most relevant programs first. By creating shortcuts, the managing device allows the programs to be easily available and displayed on relevant cooking appliances.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A computer-implemented method for managing cooking programs associated with one or more cooking appliances, the method comprising:

receiving, at an electronic device in communication with an electronic controller of a cooking appliance associated with a user of the electronic device, a food purchase record including information relating to a food item;

identifying, by the electronic device, the food item;

determining, by the electronic device, capabilities of the cooking appliance;

determining, by the electronic device, cooking programs based on the identified food item and the capabilities of the cooking appliance, wherein the cooking programs are configured to be executed by the electronic controller to prepare the food item using the cooking appliance, wherein the capabilities include methods of cooking and at least one of heating output and efficiency;

communicating, by the electronic device, instructions corresponding to the cooking programs to the cooking appliance;

causing, using processing logic of the electronic device, the cooking appliance to display shortcuts to the cooking programs on a user interface of the cooking appliance, wherein the shortcuts are dynamically organized based on user feedback or prior usage data; and in response to selection of one of the shortcuts, executing a corresponding one of the cooking programs to process the food item using the cooking appliance.

2. The method of claim 1, wherein receiving the food purchase record includes extracting the information relating to the food item from the purchase record using a text recognition program executed by the processing logic of the electronic device.

3. The method of claim 1, wherein receiving the food purchase record includes performing image recognition of the food item using the processing logic of the electronic device.

4. The method of claim 1, wherein the cooking appliance is a first cooking appliance and the electronic device is in communication with a second cooking appliance associated with the user, and wherein determining the cooking programs is based on the capabilities of both the first cooking appliance and the second cooking appliance.

5. The method of claim 1, wherein determining the cooking programs includes modifying at least one existing cooking program.

6. The method of claim 1, wherein receiving the food purchase record includes receiving a digital version of the food purchase record from a seller of the food item.

7. The method of claim 1, wherein the food item is a packaged food item having cooking instructions disclosed on a package, and a first one of the cooking programs comprises instructions corresponding to the cooking instructions disclosed on the package.

8. The method of claim 1, further comprising:

receiving, at the electronic device, cooking program information generated by a user community;

wherein determining the cooking programs is based at least in part on the information generated by the user community; and wherein the cooking program information comprises user community identification of food items, and wherein the identifying of the food item is based on the cooking program information.

9. The method of claim 1, further comprising:

automatically updating a food inventory based on the food purchase record and an amount of food used during the preparing of the food item.

10. A system for preparing a food product, the system comprising:

a cooking appliance having an electronic controller and a first user interface, wherein the electronic controller is configured to display a plurality of cooking programs for selection by a user;

a personal electronic device in communication with the cooking appliance, wherein the personal electronic device includes a second user interface and processing logic configured to:

receive information relating to available food preparation capabilities of the cooking appliance and information relating to the food product, wherein the capabilities include methods of cooking and at least one of heating output and efficiency;

identify the food product;

determine one or more corresponding cooking programs to prepare the food product based on the identified food product and the capabilities of the cooking appliance;

communicate the one or more corresponding cooking programs to the cooking appliance; and cause the cooking appliance to display, on the first user interface of the cooking appliance, respective shortcuts configured to execute the one or more corresponding cooking programs, wherein the shortcuts are dynamically organized based on user feedback or prior usage data;

wherein the electronic controller of the cooking appliance is further configured to execute a selected one of the cooking programs based on selection of one of the shortcuts by the user and to process the food product using the cooking appliance.

11. The system of claim 10, wherein the processing logic of the personal electronic device is further configured to extract the information relating to the food product from a purchase record using a text recognition program.

12. The system of claim 10, further comprising a second cooking appliance in communication with the personal electronic device, wherein the one or more cooking programs are further determined based on the capabilities of the second cooking appliance.

13. The system of claim 10, wherein determining the one or more corresponding cooking programs includes automatically modifying at least one existing cooking program.

14. The system of claim 13, wherein the personal electronic device and the cooking appliance are part of a distributed computer network, and the at least one existing cooking program is stored in a memory of the distributed computer network.

15. The system of claim 10, wherein the processing logic of the personal electronic device is further configured to receive the information relating to the food product by receiving a digital version of a food purchase record from a seller of the food product.

16. The system of claim 10, wherein the food product is a packaged food item having cooking instructions disclosed on a package, and a first one of the plurality of cooking programs comprises instructions corresponding to the cooking instructions disclosed on the package.

17. The system of claim 10, wherein the processing logic of the personal electronic device is further configured to:

automatically update a food inventory database, based on the information relating to the food product;

wherein the information relating to the food product includes at least an identifier and a quantity.

18. The method of claim 1, wherein at least one of the one or more cooking programs is modified to change a selected method of cooking to an available method of cooking of the cooking appliance.

19. The method of claim 1, further comprising providing an alert if a selected cooking program requires a function that the capabilities of the cooking appliance cannot provide, and generating, by the electronic device, a second cooking program which utilizes the capabilities of the cooking appliance.

20. The method of claim 1, further comprising categorizing, by the electronic device, food items into a relevant category and a less-relevant category, wherein the relevant category comprises food items that the cooking appliance is capable of cooking, and wherein the less-relevant category comprises food items that do not require cooking or food items that the cooking appliance is not capable of cooking.

* * * * *